United States Patent
Murayama et al.

(10) Patent No.: US 10,309,453 B2
(45) Date of Patent: Jun. 4, 2019

(54) CROSSED ROLLER BEARING

(71) Applicant: HARMONIC DRIVE SYSTEMS INC., Shinagawa-ku, Tokyo (JP)

(72) Inventors: Yuya Murayama, Azumino (JP); Naoki Kanayama, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 0 days.

(21) Appl. No.: 16/064,261

(22) PCT Filed: Dec. 21, 2015

(86) PCT No.: PCT/JP2015/085623
§ 371 (c)(1),
(2) Date: Jun. 20, 2018

(87) PCT Pub. No.: WO2017/109826
PCT Pub. Date: Jun. 29, 2017

(65) Prior Publication Data
US 2019/0003525 A1    Jan. 3, 2019

(51) Int. Cl.
*F16C 19/36*    (2006.01)
*F16C 33/58*    (2006.01)
(Continued)

(52) U.S. Cl.
CPC ............ *F16C 19/361* (2013.01); *F16C 19/36* (2013.01); *F16C 19/383* (2013.01); *F16C 33/58* (2013.01); *F16C 33/585* (2013.01); *F16C 33/80* (2013.01)

(58) Field of Classification Search
CPC .... F16C 19/362; F16C 33/585; F16C 33/586; F16C 43/06
See application file for complete search history.

(56) References Cited

U.S. PATENT DOCUMENTS

| 5,218,764 A | * | 6/1993 | Suzuki | F16C 19/163 |
| | | | | 29/557 |
| 2007/0076997 A1 | * | 4/2007 | Kunimoto | F16C 19/362 |
| | | | | 384/548 |
| 2012/0308169 A1 | * | 12/2012 | Kuo | F16C 19/362 |
| | | | | 384/447 |

FOREIGN PATENT DOCUMENTS

| DE | 102008011060 A1 * | 9/2008 | ............ F16C 19/362 |
| JP | H11-280757 A | 10/1999 | |

(Continued)

OTHER PUBLICATIONS

International Search Report (PCT/ISA/210) dated Mar. 22, 2016, by the Japan Patent Office as the International Searching Authority for International Application No. PCT/JP2015/085623.
(Continued)

*Primary Examiner* — Phillip A Johnson
(74) *Attorney, Agent, or Firm* — Buchanan Ingersoll & Rooney PC

(57) ABSTRACT

The roller insertion groove of the inner ring of a crossed roller bearing is provided with an outer circumferential surface-side groove opening that is exposed to an inner rings-side V-groove. The groove opening is defined by circumferential direction opening edge that extends in the circumferential direction along the inner ring-side V-groove and side opening edges that extend from both ends of the circumferential direction opening to the ring-shaped end face of the inner ring. Concentration of stress occurs in the corners between the circumferential direction opening edges and the side opening edges. The circumferential direction opening edge is formed so as not to coincide with the minimum outer diameter section of the inner ring-side V-groove.

3 Claims, 5 Drawing Sheets

(51) Int. Cl.
  *F16C 19/38* (2006.01)
  *F16C 33/80* (2006.01)

(56) References Cited

FOREIGN PATENT DOCUMENTS

| | | | | |
|---|---|---|---|---|
| JP | 2001-56024 A | | 2/2001 | |
| JP | 2001-116040 A | | 4/2001 | |
| JP | 2001116040 A | * | 4/2001 | |
| JP | 2005036916 A | * | 2/2005 | ............. F16C 43/06 |
| JP | 2010-151152 A | | 7/2010 | |
| JP | 2011-106544 A | | 6/2011 | |
| WO | WO-2012157021 A1 | * | 11/2012 | ............ F16C 19/362 |

OTHER PUBLICATIONS

Written Opinion (PCT/ISA/237) dated Mar. 22, 2016, by the Japan Patent Office as the International Searching Authority for International Application No. PCT/JP2015/085623.

* cited by examiner

CROSSED ROLLER BEARING

TECHNICAL FIELD

The present invention relates to a crossed roller bearing, and, in particular, to an improvement of the roller insertion groove formed in the inner ring of the bearing, into which cylindrical rollers are inserted.

BACKGROUND ART

A crossed roller bearing is, as is known, provided with inner and outer rings, an annular roller raceway that has a rectangular cross-section and is formed between the rings, a plurality of cylindrical rollers inserted rollably into the roller raceway so that they are alternately orthogonal with each other in the circumferential direction of the raceway. In a crossed roller bearing having an integral inner ring and an integral outer ring, a roller insertion groove or roller insertion hole is formed in the inner ring or outer ring in order to insert the cylindrical rollers into the roller raceway. The roller insertion groove or hole is sealed by a plug after the cylindrical rollers have been inserted. Crossed roller bearings having an inner ring formed with a roller insertion groove are proposed in Patent documents 1 and 2.

PRIOR ART DOCUMENTS

Patent Documents

Patent Document 1: JP H11-280757 A
Patent Document 2: JP 2001-56024 A

SUMMARY OF THE INVENTION

Problems to be Solved by the Invention

In a crossed roller bearing having an inner ring formed with a roller insertion groove, there is a possibility that the corners of the opening edge portion of the roller insertion groove opening to the roller raceway side become a starting point of fracture due to metal fatigue.

Specifically, as shown in FIG. 5, the roller insertion groove 101 formed in an inner ring 100 is open to the roller raceway surface portion 103 formed on the inner-ring outer circumferential surface 102. The inventors of the present invention et al found out the facts that stress is significantly concentrated on the corners 105 of the opening edge 104 of the roller insertion groove 101 opening to the roller raceway surface portion 103 and that the corners tend to become a starting point of fracture due to metal fatigue.

Especially, in a case of a crossed roller bearing in which a roller insertion groove is formed in an inner ring which is thin in thickness in the radial direction, the corners of the roller insertion groove tend to easily become a starting point of fracture due to metal fatigue, which may lead to a significant decrease in the fatigue strength.

An object of the present invention is to provide a crossed roller bearing which is capable of improving the fatigue strength by mitigating the stress concentration occurred in the corners of the roller insertion groove formed in the inner ring.

Means of Solving the Problems

In order to solve the above problems, a crossed roller bearing according to the present invention has:

an inner ring and an outer ring;
a roller raceway that is formed between an inner ring-side V-groove formed in an inner-ring outer circumferential surface and an outer ring-side V-groove formed in an outer-ring inner circumferential surface;
a plurality of rollers inserted into the roller raceway;
a roller insertion groove formed in the inner ring for inserting the rollers into the roller raceway; and
a plug for sealing the roller insertion groove,
wherein the inner ring-side V-groove is provided with:
a pair of inclined raceway surfaces on which the roller roll;
a concave surface formed between the inclined raceway surfaces so as to not contact with the rollers; and
a minimum outer diameter section of the inner ring that is located within the concave surface,
wherein the roller insertion groove is provided with:
an end face-side groove opening that exposes to one of ring-shaped end faces of the inner ring; and
an outer circumferential surface-side groove opening that continues to the end face-side groove opening and exposes to the inner ring-side V-groove in the inner-ring outer circumferential surface, and
wherein the outer circumferential surface-side groove opening is defined by a circumferential direction opening edge extending in a circumferential direction along the inner ring-side V-groove and a pair of side opening edges extending from both ends of the circumferential direction opening edge to the ring-shaped end faces, and
the circumferential direction opening edge of the roller insertion groove is formed at a position deviated from the minimum diameter section of the concave surface.

The roller insertion groove is open to the inner ring-side V-groove in the inner-ring outer circumferential surface. The opening or outer circumferential surface-side groove opening is defined by the circumferential direction opening extending in the circumferential direction along the inner ring-side V-groove and the pair of side opening edges extending from the both ends of the circumferential direction opening edge to the ring-shaped end faces of the inner ring. Concentration of stress occurs in the corners of the inner ring-side V-groove of the inner ring where the circumferential direction opening edge intersects the side opening edges.

The inventors of the present invention et al focused on the groove depth of the roller insertion groove formed in the inner ring, specifically, the groove depth measured from the ring-shaped end face of the inner ring along the direction of the inner-ring center axis line. The location of the circumferential direction opening edge of the outer circumferential surface-side groove opening formed in the inner ring-side V-groove is shifted in the direction of the inner-ring center axis by changing the groove depth. In the present invention, the groove depth is set so that the circumferential direction opening edge is located at a position deviated from the minimum outer diameter section. The present inventors et al confirmed that the concentration of stress occurred in the corners in the outer circumferential surface-side groove opening can be mitigated significantly in comparison with a case in which the circumferential direction opening edge coincides with the minimum outer diameter section of the inner ring-side V-groove.

The circumferential direction opening edge of the roller insertion groove is formed at an opposite position to the ring-shaped end face with respect to the minimum outer diameter section, for example.

For example, the roller insertion groove may be such a groove that is provided with:

a groove bottom surface extending from the circumferential direction opening edge of the outer circumferential surface-side groove opening in the direction orthogonal to the inner-ring center axis line;

a pair of groove side surfaces extending from the respective side opening edges of the outer circumferential surface-side groove opening in the direction orthogonal to the inner-ring center axis line; and a groove end surface connecting the ends of the groove side surfaces with each other.

Effects of the Invention

In the crossed roller bearing of the present invention, the concentration of stress that occurs in the corners of the outer circumferential surface-side groove opening of the roller insertion groove in the inner-ring outer circumferential surface can be significantly mitigated. Accordingly, the inner ring can be prevented from decreasing in the fatigue strength caused by the provision of the roller insertion groove. In addition, the fatigue strength of a crossed roller bearing having an inner ring formed with a roller insertion groove can be increased in comparison with the conventional one, so that the load capacity of the crossed roller bearing can be improved. Furthermore, since the strength of the inner ring can be improved by mitigating the stress concentration due to the provision of the roller insertion groove, it is possible to reduce the weight of the crossed roller bearing by making the thickness of the inner ring thinner than the conventional one.

MODE FOR CARRYING OUT THE INVENTION

An embodiment of a crossed roller bearing according to the present invention will be described below with reference to the drawings.

Figure 1:
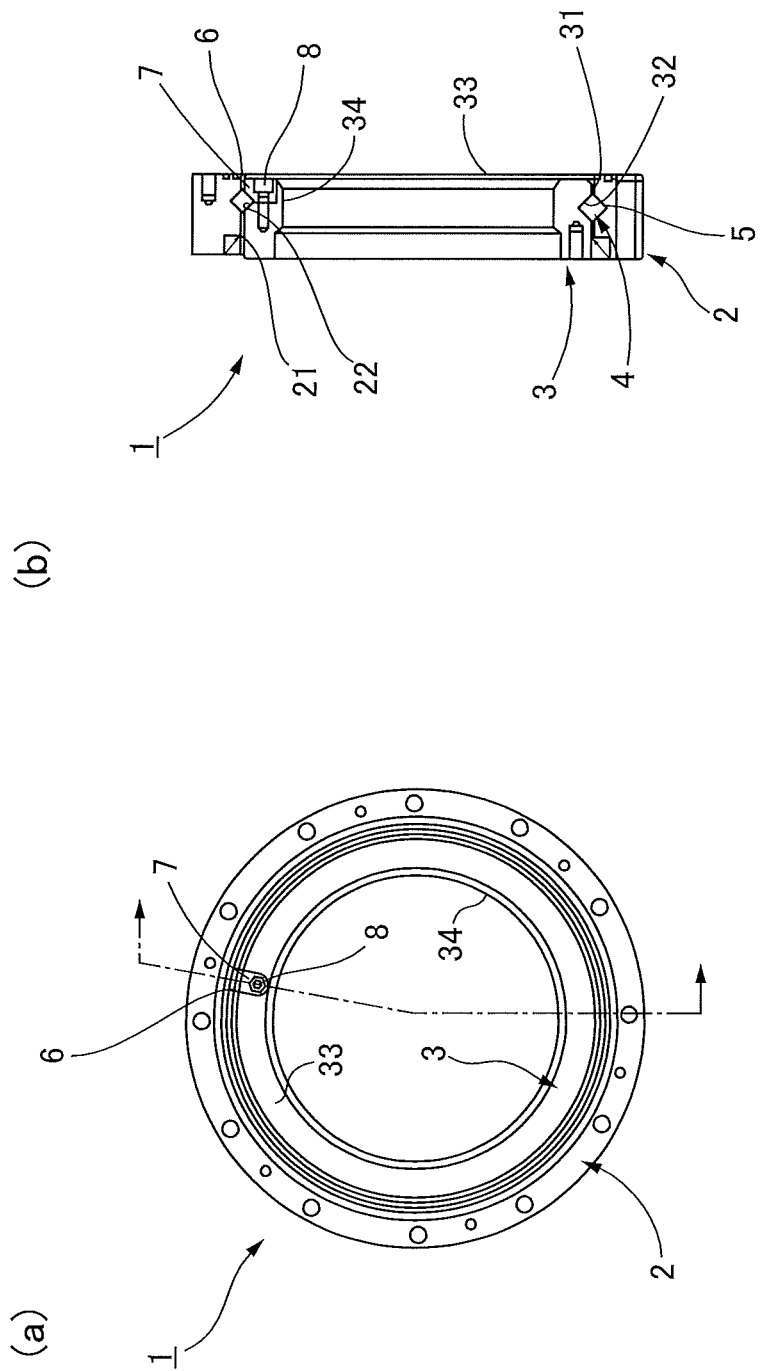
FIGS. 1(a) and 1(b) include an end view and a cross-sectional view of a crossed roller bearing according to the present invention.
Figure 2:
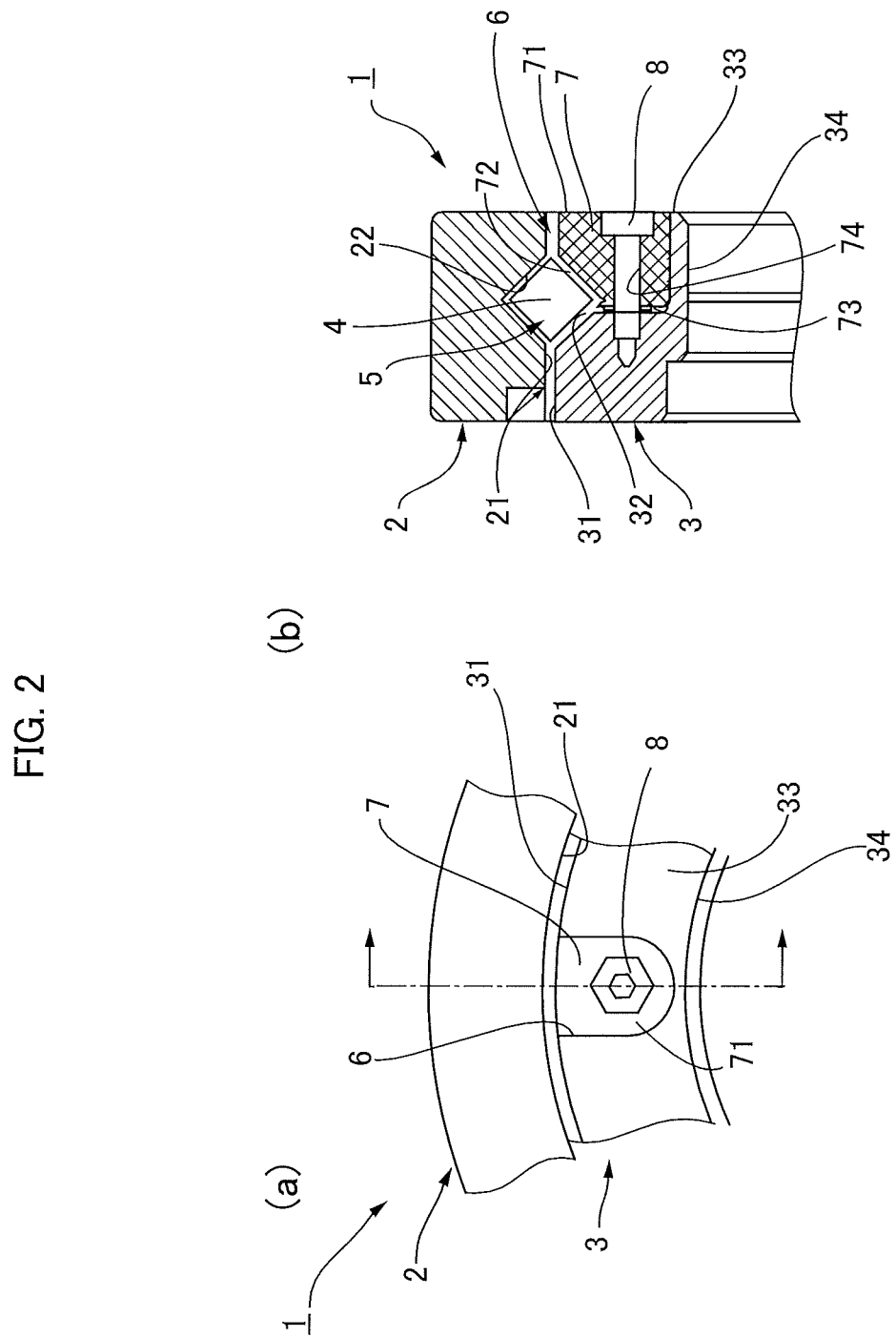
FIGS. 2(a) and 2(b) include an enlarged partial end view and an enlarged partial cross-sectional view illustrating a section of the roller insertion groove of the crossed roller bearing of FIGS. 1(a) and 1(b)

FIG. 1(a) is an end view illustrating an example of crossed roller bearing of the present embodiment, and FIG. 1(b) is a cross-sectional view thereof. FIG. 2(a) is a partial cross-sectional view illustrating the portion of a roller insertion groove in an enlarged manner, and FIG. 2(b) is a partial cross-sectional view thereof.

As illustrated in these drawings, a crossed roller bearing 1 is provided with an integral outer ring 2 and an integral inner ring 3. The outer ring 2 has a circular outer-ring inner circumferential surface 21 formed with an outer ring-side V-groove 22 which is open to the inner side. The inner ring 3 has a circular inner-ring outer circumferential surface 31 formed with an inner ring-side V-groove 32 opening to the outer side. A roller raceway 4, which is an annular roller insertion section having a rectangular cross-section, is defined by the outer ring-side V-groove 22 and the inner ring-side V-groove 32. A plurality of columnar rollers 5 are inserted in a rotatable state into the roller raceway 4 along the circumferential direction thereof. The rollers 5 are arranged in a state in which the center axes thereof are alternately orthogonal to each other.

The inner ring 3 is formed with a roller insertion groove 6. The roller insertion groove 6 is formed by cutting out a part of one ring-shaped end face 33 of the inner ring 3. The roller insertion groove 6 of the present example is a groove that extends with a fixed width in the radial direction from the inner-ring outer circumferential surface 31 to the vicinity of the inner-ring inner circumferential surface 34. The roller insertion groove 6 is sealed by a plug 7. The plug 7 is fastened and fixed to the side of the inner ring 3 by a fastening bolt 8.

The plug 7 has a shape complementary to the roller insertion groove 6, and is provided with an end face 71 defining a part of the ring-shaped end face 33 of the inner ring 3 and with a raceway surface portion 72 defining a part of the inner ring-side V-groove 32, as illustrated in FIG. 2(b). A bolt insertion hole 74, which extends from the end face 71 to pass through the opposite-side end face 73, is also formed.

Figure 3:
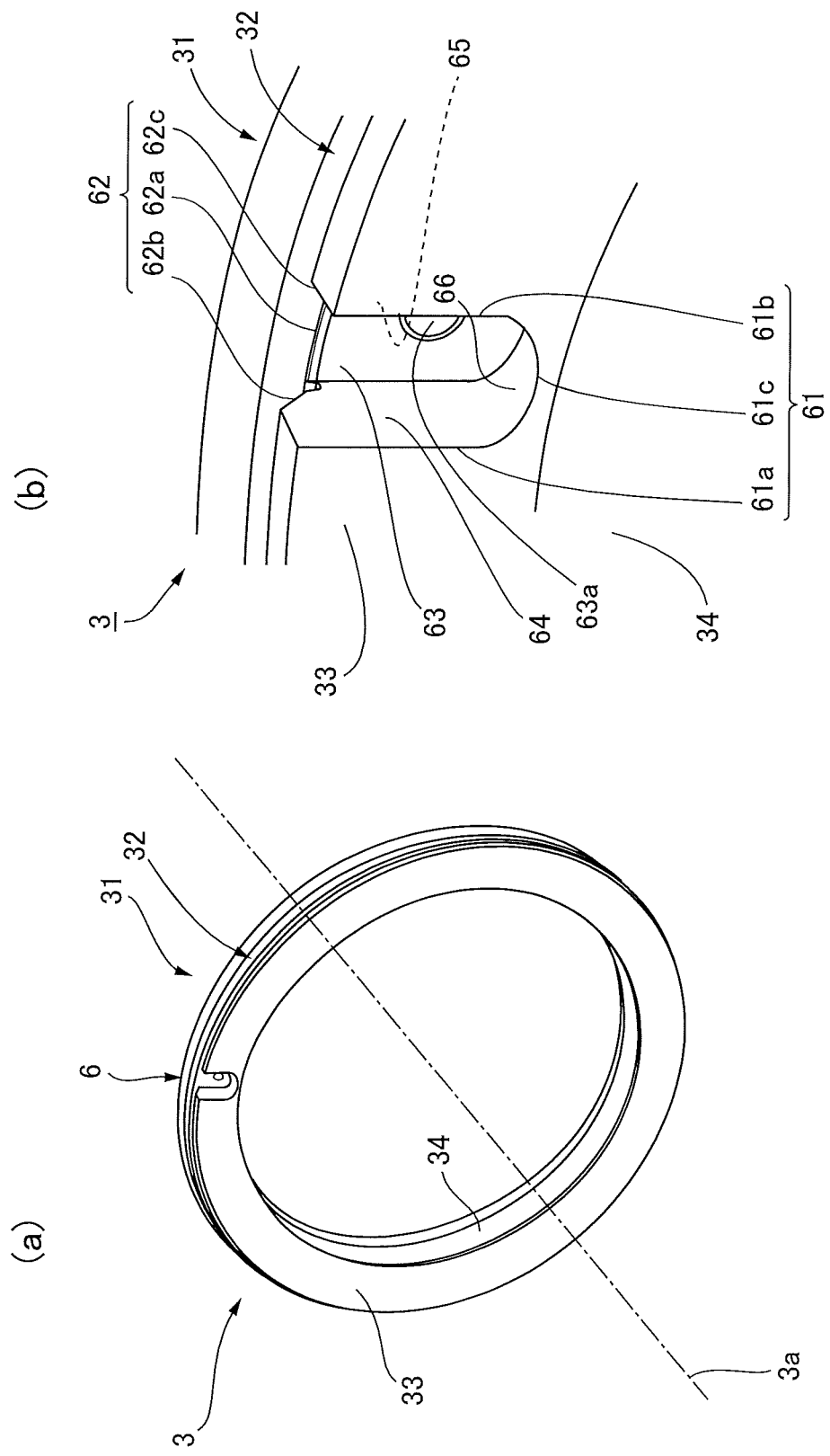
FIGS. 3(a) and 3(b) include a perspective view illustrating the inner ring of the crossed roller bearing of FIGS. 1(a) and 1(b), and an enlarged partial perspective view illustrating the roller insertion groove thereof.
Figure 4:
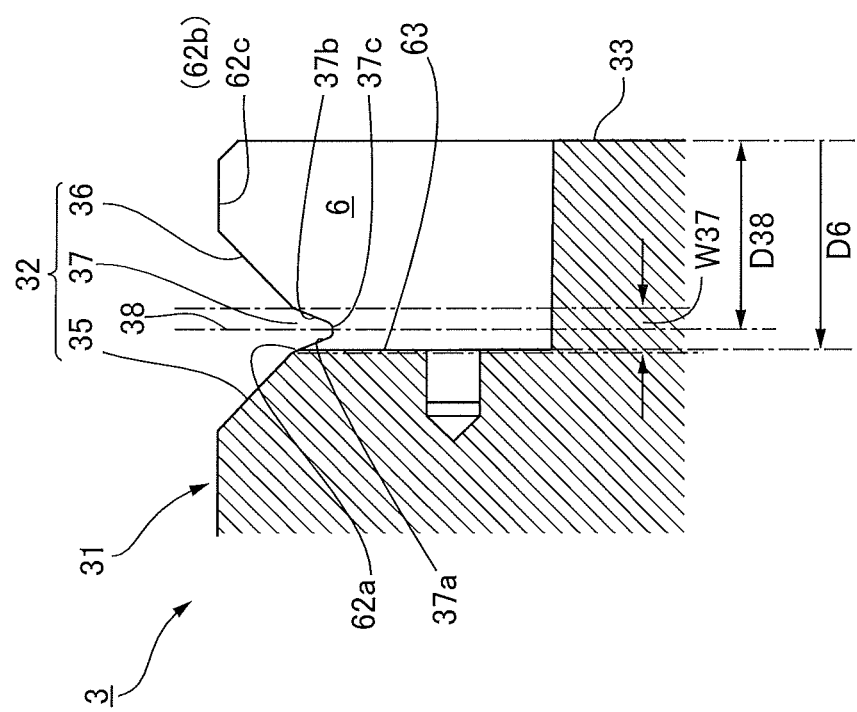
FIG. 4 is an enlarge partial cross-sectional view illustrating a section of the inner ring-side V-groove of FIGS. 3(a) and 3(b)
Figure 5:
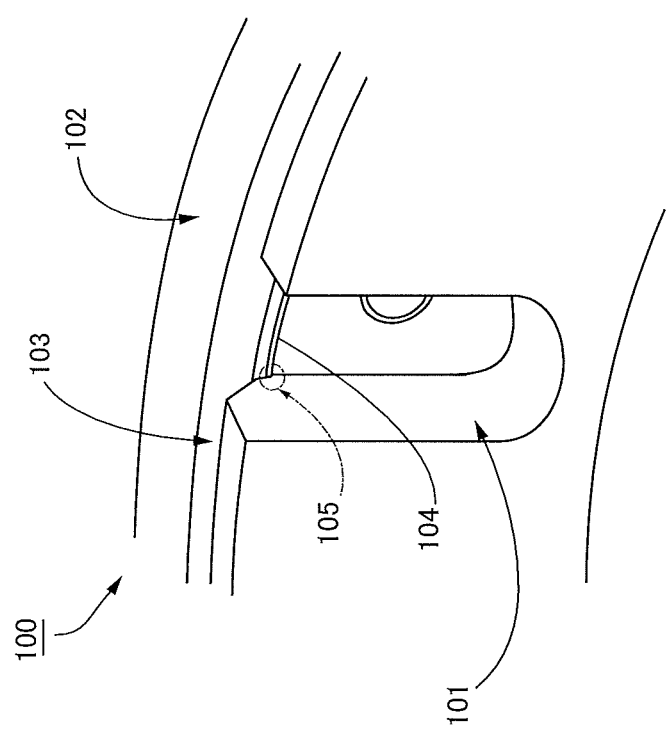
FIG. 5 is an explanatory view illustrating a section of the inner ring formed with the roller insertion groove where the concentration of stress occurs.

FIG. 3(a) is a perspective view illustrating the inner ring 3, and FIG. 3(b) is an enlarged partial perspective view illustrating a section where the roller insertion groove is formed. FIG. 4 is an enlarged partial cross-sectional view illustrating the inner ring-side V-groove 32.

The inner ring-side V-groove 32 is provided with a pair of inclined raceway surface 35 and 36 on which the rollers 5 roll as illustrated in FIG. 4. These inclined raceway surfaces 35 and 36 are such inclined surfaces that are inclined by 45 degrees in opposite directions with respect to the inner-ring center axis line 3a (refer to FIG. 3(a)). Between the inclined raceway surfaces 35 and 36, is formed a concave surface 37 which is one step deep to the inner side in the inner-ring radial direction. The concave surface 37 is a portion with which the roller 5 do not come in contact and which is necessary for V-groove machining.

The roller insertion groove 6 is a groove which is formed by cutting out a part of the inner ring 3 into a rectangular shape as a whole and which is open in two directions of the inner-ring end face direction (along the direction of the inner-ring center axis 3a) and the inner-ring radial direction. Specifically, the roller insertion groove 6 is provided with an end face-side groove opening 61 exposed to the ring-shaped end face 33 of the inner ring 3 and an outer circumferential surface-side groove opening 62 which continues to the end surface-side groove opening 61 and exposes to the inner ring-side V-groove 32 of the inner-ring outer circumferential surface 31.

The end face-side groove opening 61 is defined by a pair of straight-line end-surface opening edges 61a and 61b, and a curved end-face opening edge 61c which connects these end-face opening edges 61a and 61b. The end-face opening edges 61a and 61b extend in parallel at a constant gap from the inner-ring outer circumferential surface 31 toward the inner-ring inner circumferential surface 34 along the inner-ring radial direction. The curved end-face opening edge 61c is smoothly connected to the radially inner ends of the straight-line end-face opening edges 61*a* and 61*b*.

The outer circumferential surface-side groove opening 62 is defined by a circular arc-shaped circumferential direction opening edge 62*a* and a pair of side opening edges 62*b* and 62*c* extending from the both ends of the circumferential direction opening edge 62*a* to the ring-shaped end face 33.

The roller insertion groove 6 thus opening in the two directions is defined by a flat groove bottom surface 63 extending from the circumferential direction opening edge 62*a* to a direction orthogonal to the inner-ring center axis line 3*a* (the inner side of the inner-ring radial direction); a pair of flat groove side surfaces 64 and 65 respectively extending from the side opening edges 62*b* and 62*c* in a direction orthogonal to the inner-ring center axis line 3*a*; and a groove end surface 66 having a curved surface and connecting the radially inner side ends of the groove side surfaces 64 and 65 with each other. A bolt hole 63*a* is open in the groove bottom surface 63.

Here, as illustrated in FIG. 4, the concave surface 37 is formed at the center of the inner ring-side V-groove 32 in the width direction thereof (the direction of the inner-ring center axis line 3*a*). The concave surface 37 is defined by a pair of tapered surfaces 37*a* and 37*b* extending from the radial inner ends of the inclined raceway surfaces 35 and 36; and a circular arc surface 37*c* smoothly connecting between the radial inner ends of the tapered surfaces 37*a* and 37*b*. The center position of the circular arc surface 37*c* in the direction of the inner-ring center axial line 3*a* is the minimum outer diameter section 38 of the inner ring 3. When viewed along the inner-ring width direction (which is the direction of the inner-ring center axis line 3*a*), the groove bottom surface 63 of the roller insertion groove 6 is located at a position within the width W37 of the area where the concave surface 37 is formed, and at the same time is located at a position deviated from the minimum outer diameter section 38.

Therefore, the circumferential direction opening edge 62*a*, which is an end of the groove bottom surface 63 on the side of the inner ring-side V-groove 32, is formed at a position deviated from the minimum outer diameter section 38 on the concave surface 37. Specifically, the inner corner between the circumferential direction opening edge 62*a* of the outer circumferential-side groove opening 62 and the side opening edge 62*b* and the inner corner between the circumferential direction opening edge 62 and the other side opening edge 62*c* are both formed at positions deviated from the minimum outer diameter section 38.

Where the distance from the ring-shaped end face 33 to the minimum outer diameter section 38 is D38, the width of the curved surface 37 is W37, the groove depth of the roller insertion groove 6 (which is the distance from the ring-shaped end face 33 to the groove bottom surface 63 or the circumferential direction opening edge 62*a*) is D6, the values thereof satisfy the following two conditions:

$$D38-W37/2 \leq D6 \leq D38+W37/2$$

$$D6 \neq D38$$

In the present example, as shown in FIG. 4, the groove depth of the roller insertion groove 6 is set so that the groove bottom surface 63 is positioned at the opposite side to the ring-shaped end face 33 with respect to the minimum outer diameter section 38 in the concave surface 37.

$$D38 < D6 < D38 + W37/2$$

In the inner ring 3 having the roller insertion groove 6, the stress appeared in the portion where the roller insertion groove 6 is formed (cross-section defective part) is increased due to the formation of the roller insertion groove 6. The stress is also concentrated on the inner corners of the cross-section defective part where the roller insertion groove 6 is formed.

In the inner ring 3 of the present example, the outer diameter of the groove bottom section of the roller insertion groove 6, which is the outer diameter of the circumferential direction opening edge 62*a*, is greater than that of the minimum outer diameter section 38 of the inner ring 3. Accordingly, increase in stress caused by the removal of material from the inner ring 3 for the formation of the roller insertion groove 6 will not occur on the same location where the concentration of stress occurs due to the notched state of the roller insertion groove 6.

As a result, the concentration of stress, which occurs in the inner corners of the outer circumferential surface-side groove opening 62 in the roller insertion groove 6, is mitigated, whereby suppressing the fatigue fracture staring from the inner corners. Accordingly, the fatigue strength of the inner ring 3 can be enhanced.

The invention claimed is:

1. A crossed roller bearing comprising:
   an inner ring and an outer ring;
   a roller raceway that is formed between an inner ring-side V-groove formed in an inner-ring outer circumferential surface and an outer ring-side V-groove formed in an outer-ring inner circumferential surface;
   a plurality of rollers inserted into the roller raceway;
   a roller insertion groove formed in the inner ring for inserting the rollers into the roller raceway; and
   a plug for sealing the roller insertion groove,
   wherein the inner ring-side V-groove has:
   a pair of inclined raceway surfaces along which the roller roll;
   a concave surface formed between the inclined raceway surfaces so as to not contact with the rollers; and
   a minimum outer diameter section of the inner ring, the minimum outer diameter section being located within the concave surface,
   wherein the roller insertion groove has:
   an end face-side groove opening that exposes to one of ring-shaped end faces of the inner ring; and
   an outer circumferential surface-side groove opening that continues to the end face-side groove opening and exposes to the inner ring-side V-groove in the inner-ring outer circumferential surface, and
   wherein the outer circumferential surface-side groove opening is defined by a circumferential direction opening edge extending in a circumferential direction along the inner ring-side V-groove and a pair of side opening edges extending from both ends of the circumferential direction opening edge to the ring-shaped end faces, and
   the circumferential direction opening edge of the roller insertion groove is formed at a position deviated from the minimum diameter section of the concave surface.

2. The crossed roller bearing according to claim 1, wherein the circumferential direction opening edge of the roller insertion groove is formed at an opposite position to the ring-shaped end face relative to the minimum outer diameter section.

3. The crossed roller bearing according to claim 2, wherein the roller insertion groove has:
   a groove bottom surface extending from the circumferential direction opening edge of the outer circumferential surface-side groove opening in a direction orthogonal to an inner-ring center axis line;
a pair of groove side surfaces extending from the respective side opening edges of the outer circumferential surface-side groove opening in the direction orthogonal to the inner-ring center axis line; and
a groove end surface connecting the ends of the groove side surfaces with each other.

* * * * *